United States Patent [19]

Sheldon, Jr. et al.

[11] Patent Number: 5,394,680
[45] Date of Patent: Mar. 7, 1995

[54] SPINDLE ASSEMBLY FOR A COTTON HARVESTER

[75] Inventors: Donald H. Sheldon, Jr., Johnston; Timothy A. Deutsch, Newton; Jeffrey S. Wigdahl, Ames, all of Iowa

[73] Assignee: Deere & Company, Moline, Ill.

[21] Appl. No.: 200,787

[22] Filed: Feb. 22, 1994

[51] Int. Cl.⁶ ............................................. A01D 46/16
[52] U.S. Cl. ............................................. 56/41; 56/50
[58] Field of Search .................... 56/50, 41, 44, 45, 28

[56] References Cited

U.S. PATENT DOCUMENTS

| | | | |
|---|---|---|---|
| 2,497,777 | 2/1950 | Baker et al. | 56/50 |
| 2,668,410 | 2/1954 | Bramblett | 56/44 |
| 2,670,585 | 3/1954 | Hagen et al. | 56/41 |
| 3,718,964 | 3/1973 | Warezak | 29/200 P |
| 4,331,496 | 5/1982 | Orndorff, Jr. | 156/187 |
| 4,757,671 | 7/1988 | McConnell | 56/50 |
| 5,332,348 | 7/1994 | Lemelson | 411/427 |

OTHER PUBLICATIONS

Polygon Co., Polygon Co. brochure, pp. 2–5, dated Feb. 1994, published in the U.S.A.

Primary Examiner—Stephen J. Novosad

[57] ABSTRACT

A spindle nut and bushing assembly for cotton picker row units includes a light-weight spindle nut and a single elongated bushing having a length to outer diameter ratio of greater than two. The bushing extends through substantially the entire length of the spindle nut to provide a low friction bearing surface with sufficient strength to reinforce the spindle nut against breakage even when the spindle is impacted and fractured by an obstacle. In one embodiment of the invention, the nut is formed from a thermoplastic material and the bushing is fabricated from powdered metal, preferably a sintered bronze-iron alloy, and includes elongated grooves which act as lubricant reservoirs. In another embodiment, the bushing is formed from a filament-wound fiberglass material. The weight of the plastic nut is less than 75% of that of a conventional steel nut. In an alternative embodiment, the nut is fabricated from a lightweight metal such as aluminum.

22 Claims, 1 Drawing Sheet

SPINDLE ASSEMBLY FOR A COTTON HARVESTER

BACKGROUND OF THE INVENTION

1. Field of the Invention

The present invention relates generally to cotton harvester spindles and, more specifically, to a spindle nut and bushing assembly.

2. Related Art

Cotton pickers typically include from two to five forwardly located row units, each unit supporting a pair of upright picker drums having from twelve to sixteen picker bars. Each picker bar, in turn, rotatably supports up to twenty picker spindles. A total of up to 320 spindles are therefore supported from each drum. A large amount of mass is put in motion when the picker drums are rotated. The row units are relatively heavy and their weight shifts center of gravity of the harvester forwardly.

Each spindle is supported in a picker bar by an assembly including a threaded metal nut having a cylindrically shaped bore and a two-piece metal bushing pressed into opposite ends of the bore. The spindle is inserted into the two-piece bushing and a dust collar is placed over the spindle adjacent the outer end of the nut. The opposite end of the nut is then threaded into the picker bar so that a spindle bevel gear meshes with a similar bevel gear on a drive shaft which extends through the bar. Such a spindle assembly is shown, for example, in U.S. Pat. No. 4,757,671 which is of common ownership with the present invention.

The nut and bushing assembly adds considerable weight to the unit. The nut alone accounts for over 47 kilograms per two-drum row unit. The two-piece pressed bushing has been necessary in the past designs to provide a lubricant cavity between the bushing components and to limit the bushing outer diameter to length ratio. However, such a two-piece design presents opportunity for bushing misalignment, increases the number of parts, and results in a less than optimum coefficient of friction.

To minimize spindle bar damage on impact, the spindle is designed to break off near the end of the spindle nut if a large force at an angle to the spindle axis is encountered, for example, if the spindle hits a rock or post or the like. The nut must remain intact for proper spindle breaking action.

BRIEF SUMMARY OF THE INVENTION

It is therefore an object of the present invention to provide an improved spindle nut and bushing assembly for a cotton harvester which overcomes most or all of the abovementioned problems. It is another object to provide such an assembly which significantly reduces row unit weight.

It is a further object to provide such an improved spindle nut and bushing assembly which is substantially lighter than conventional assemblies. It is another object to provide such an assembly which is strong and resists breakage, even when the supported spindle is fractured by an impact force.

It is still a further object of the present invention to provide an improved spindle nut and bushing assembly for a harvester which eliminates problems of bushing misalignment and has a reduced coefficient of friction compared to most conventional assemblies. It is a further object to provide such an assembly having a reduced number of components. It is yet a further object to provide such an assembly wherein the bushing provides reinforcement for the spindle nut.

A spindle assembly constructed in accordance with the teachings of the present invention includes a light-weight spindle nut and a single elongated bushing extending through substantially the entire length of the spindle nut to provide a low friction bushing and sufficient nut reinforcement to resist nut breakage even when the spindle is impacted and broken by an obstacle. The nut is preferably fabricated from an impact resistant reinforced thermoplastic material, or, alternatively, a light-weight metal such as aluminum. In one embodiment of the invention, the bushing is fabricated from powdered metal, wherein the metal is preferably a sintered bronze-iron alloy. In another embodiment, the bushing is formed from a very filament wound composite material with a specific gravity much less than bronze or steel. The bushing has a length substantially greater than twice its outer diameter.

The plastic nut weighs less than 75% of that of a conventional steel spindle nut and reduces the weight of moving row unit components by substantially over three hundred pounds on a four-row cotton picker. The problems associated with a two-piece bushing including misalignment, increased coefficient of friction and an increased number of parts are eliminated. The light-weight spindle assembly is simple and results in decreased horsepower requirements and less wear and stress in the picking units and the unit support and drive structures.

These and other objects, features and advantages of the present invention will become apparent to one skilled in the art upon reading the following detailed description in view of the drawings.

DETAILED DESCRIPTION OF THE DRAWINGS

Figure 1:
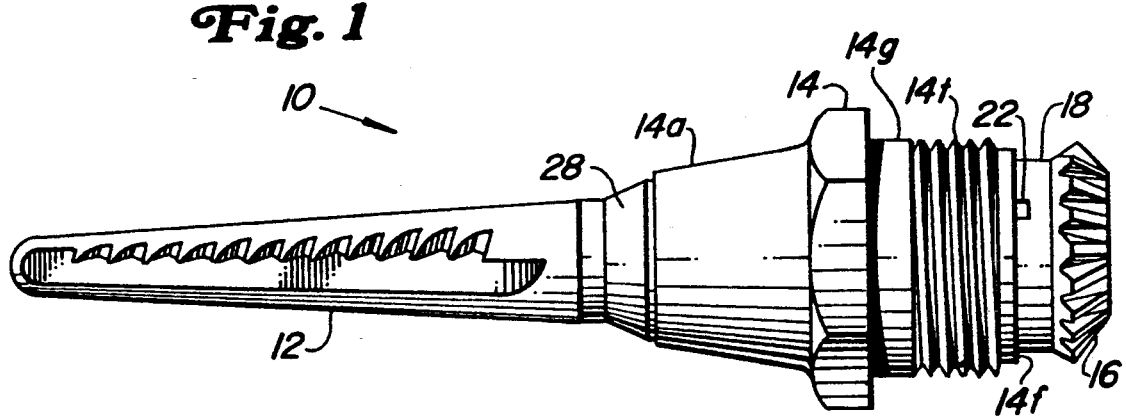
FIG. 1 is an elevational view of a complete spindle assembly.

Referring now to FIG. 1, therein is shown a spindle assembly 10 including a conventional picker spindle 12 with a cylindrically shaped shank bearing portion 12b supported for rotation within a nut 14. The nut 14 includes an innermost threaded end 14t and an outermost end 14a. The spindle 12 includes an axially innermost bevel gear 16 adjacent the bearing portion 12b and opposite the picking end.

A one-piece bushing 18 having an enlarged end 18c and cylindrical bore or bearing surface 19 is received within a bore 20 in the nut 14. The bushing 18 extends substantially the length of the bore 20 (FIG. 2) and is retained axially in position by the end 18c which abuts an end face 14f at the threaded end 14t. Diametrically opposed lubricant grooves 22 extend inwardly from the outer surface of the enlarged end 18c to the inner surface of the bushing 18 to provide channels for spindle lubricant to flow from the spindle bar interior to the spindle bearing portion 12b. The end 14a of the nut 14 includes a short enlarged bore 24 (FIG. 2) having an inner shoulder which aligns with the outermost face of the bushing 18. A tapered dust collar 28 is supported on the shank of the spindle 12 adjacent the bearing portion 12b and includes a cylindrical portion located within the enlarged bore 24. The cylindrical portion of the dust collar 28 has an inwardly directed face which abuts against the outwardly directed face of the bushing 18.

The end 14t of the nut 14 is threaded into a mating threaded portion in the spindle bar (not shown) to secure the spindle assembly 10 in the bar with the bevel gear 16 meshing with a corresponding bevel gear on the spindle drive shaft within the bar. The spindle 12 is rotated about its axis within the bushing 18 with the bearing portion 12b in frictional contact with the inner bearing surface 19 of the bushing. Lubricant from the spindle bar is channelled through the grooves 22 to the bearing surfaces.

Preferably, the nut 14 is fabricated from a light-weight material so that it weighs substantially less than the conventional steel nut. In one embodiment of the invention, the nut 14 is molded from a reinforced thermoplastic material, such as Estilock TM reinforced thermoplastic 61060 or 59600 commercially available from the B. F. Goodrich Company, Cleveland, Ohio. Alternately, a light-weight metal such as aluminum is used to fabricate the nut 14. By using the thermoplastic material, the weight of the nut 14 is reduced from that of a conventional nut (about 84 grams) to approximately 18 grams resulting in a weight savings of well over 300 pounds on a 4-row cotton picker. The plastic nut 14 is injection molded with 1-14 threads without conventional thread relief and has a slightly tighter fit to the mating bar threads than conventional nuts. At the end of the nut, the threads blend into a beginning pilot. The thread start is recessed, and the thread groove (in the area indicated at 14a) normally associated with a standard metal spindle nut is eliminated. The threads have a rounded root 14r. The radius of the area 14g, $R_g$, is approximately equal to the radius of the outermost portion of the threads 14t (FIG. 2) and therefore substantially greater than the radius, $R_2$, of the nut at the thread root 14r.

Figure 2:
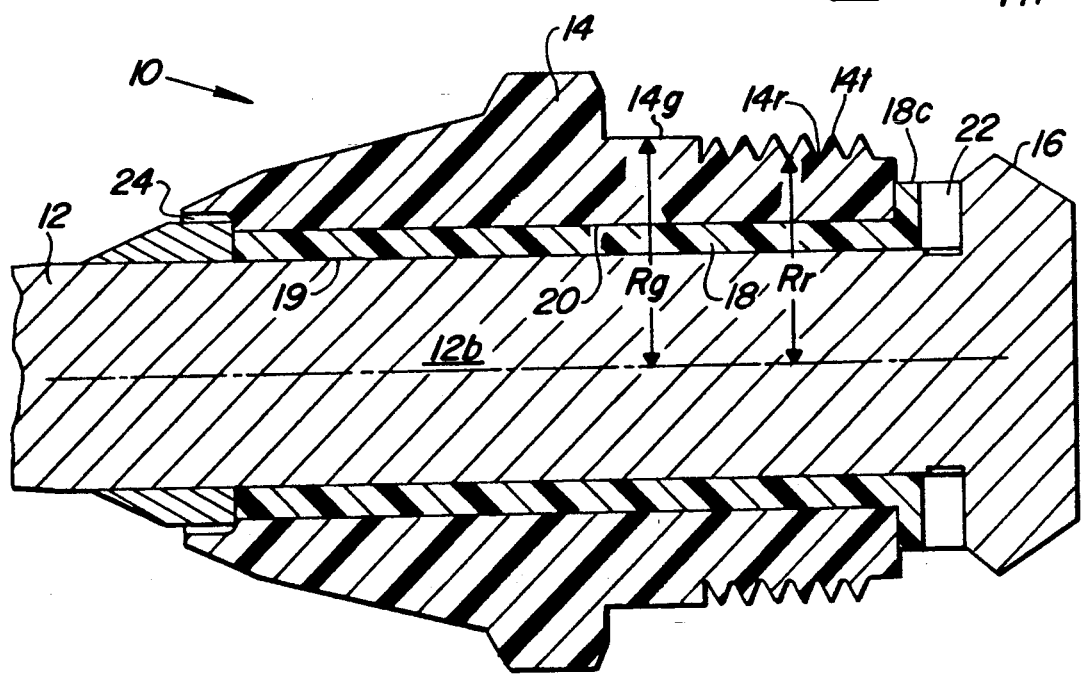
FIG. 2 is a cross sectional view of the portion of the spindle assembly including the nut and bushing assembly.
Figure 3:
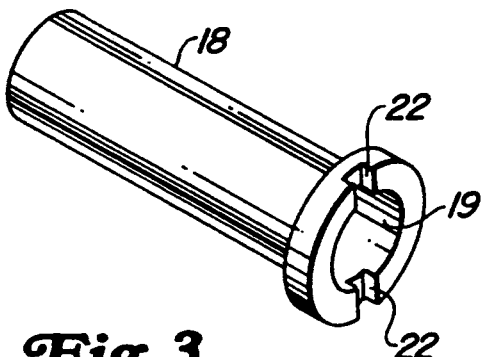
FIG. 3 is a perspective view of the non-metallic bushing utilized with the structure of FIG. 2.
Figure 4:
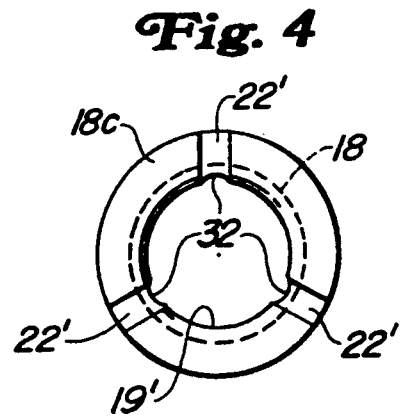
FIG. 4 is an end view of a metallic bushing utilized with one embodiment of the invention.

The bushing 18 as shown in FIGS. 2 and 3 is fabricated as a single piece structure from a light-weight nonmetallic material such as filament-wound fiberglass chemically bonded with epoxy which is commercially available as POLY LUBE bearings from the Polygon Company of Walkerton, Ind. Alternately, as shown in FIG. 4, the bushing 18' is a single piece powdered metal structure, preferably formed from a sintered bronze-iron alloy. The metallic bushing 18' of FIG. 4 includes three lubrication grooves 22' extending axially inwardly from the outer surface of the enlarged end 18c to three radiused grooves 32 located in the bore 19' and extending axially outwardly the length of the bore. The axial grooves provide a path for lubricant which extends along the bore 19' and act as lubricant reservoirs without substantially reducing the nut reinforcing characteristics or the bearing surface area of the bushing.

The bushing 18 has an axial length greater than twice its diameter. To minimize damage, the spindle 12 is designed to fracture near the end of the spindle nut 14a if a large force at an angle to the spindle axis is encountered, for example, if the spindle hits a rock or post or the like. The nut 14 must remain intact for proper spindle fracturing, and the bushing 18 provides added strength to the light-weight nut 14 to facilitate the spindle fracturing action.

Having described the preferred embodiment, it will become apparent that various modifications can be made without departing from the scope of the invention as defined in the accompanying claims.

We claim:

1. A spindle assembly adapted for mounting in a spindle bar of a cotton harvester, the assembly comprising:
    an elongated nut fabricated from a plastic, the nut having a connecting end adapted for receipt by the spindle bar and an outermost end opposite the connecting end, the nut including a bore extending therethrough and an innermost threaded portion on the connecting end, the threaded portion extending outwardly and terminating immediately adjacent to a non-threaded portion;
    means for strengthening the nut against breakage including a bushing having a length substantially equal to the length of the bore and positioned within the bore, wherein the threaded portion includes threads having a root which is rounded and defines a preselected nut radius at the root, and wherein the non-threaded portion has a radius substantially greater than the nut radius at the root to strengthen the area of the nut immediately outwardly of the threads; and
    a cotton picker spindle having a bearing portion supported in the bushing for rotation about a spindle axis, the spindle having a picking end projecting outwardly in the direction of the axis from the outermost end of the nut.

2. The invention as set forth in claim 1 wherein the bushing comprises a cylindrically shaped element fabricated from powdered metal.

3. The invention as set forth in claim 1 wherein the bushing comprises a cylindrically shaped element fabricated from a nonmetallic material.

4. The invention as set forth in claim 3 wherein the nonmetallic material includes a filament-wound fiberglass.

5. The invention as set forth in claim 1 wherein the nut includes a thread start located at the innermost end of the threads and recessed from the radially outermost area of the threads.

6. The invention as set forth in claim 5 wherein the bushing comprises a unitary structure fabricated from metal.

7. The invention as set forth in claim 5 wherein the bushing comprises a unitary nonmetallic structure.

8. The invention as set forth in claim 5 wherein the plastic material comprises reinforced thermoplastic.

9. The invention as set forth in claim 6 wherein the bushing comprises a sintered bronze-iron alloy.

10. The invention as set forth in claim 6 wherein the bushing has a length greater than twice its diameter.

11. A spindle assembly adapted for mounting in a spindle bar of a cotton harvester, the assembly comprising:
    an elongated nut having an innermost connecting end with threads adapted for being threadingly received in the spindle bar and an outermost end opposite the connecting end, the nut fabricated from a light-weight material having a weight substantially less than steel and including a bore extending therethrough;
    a cotton picker spindle having an axis and supported within the bore of the nut for rotation about the axis, the spindle having a picking end projecting outwardly in the direction of the axis from the outermost end of the nut, wherein the spindle is adapted to fracture at a preselected location adjacent the outermost end of the nut if an obstacle is encountered;

an elongated bushing having a substantially continuous bearing surface adjacent the threads and outwardly toward the outermost end with a length approximately equal to the length of the bore and positioned within the bore between the connecting end and the outermost end thereby adding reinforcing strength to the nut;

wherein the nut includes structure for increasing the breaking resistance thereof to facilitate the fracturing of the spindle at the preselected location upon the encountering of an obstacle, the structure for increasing the breaking resistance including a central portion immediately adjacent the threads having a radius at least equal to the radius of a radially outermost portion of the threads; and wherein the spindle includes a shank bearing portion rotatably supported within by the bearing surface.

12. The invention as set forth in claim 11 wherein the nut is fabricated from a plastic material.

13. The invention as set forth in claim 11 wherein the nut is fabricated from aluminum.

14. The invention as set forth in claim 11 wherein the bushing is fabricated from metal.

15. The invention as set forth in claim 14 wherein the bushing has a diameter less than one-half the axial length of the bore of the nut.

16. The invention as set forth in claim 11 wherein the bushing includes an end having a diameter greater than the diameter of the bore and positioned against connecting end of the nut, the bushing end including a radially extending lubrication groove extending toward the bearing surface.

17. The invention as set forth in claim 11 wherein the bushing includes an axially extending lubrication groove.

18. The invention as set forth in claim 17 wherein the groove extends substantially the length of the bushing and defines a lubrication reservoir along the length of the bushing.

19. The invention as set forth in claim 18 wherein the groove is radiused.

20. The invention as set forth in claim 11 wherein the bushing is fabricated from a filament-wound fiberglass material.

21. A spindle assembly adapted for mounting in a spindle bar of a cotton harvester, the assembly comprising:

an elongated nut having an innermost connecting end with threads adapted for being threadingly received by the spindle bar and an outermost end opposite the connecting end, the nut fabricated from a light-weight material having a weight substantially less than steel and including a bore extending therethrough;

a cotton picker spindle having an axis and supported within the bore of the nut for rotation about the axis, the spindle having a picking end projecting outwardly in the direction of the axis from the outermost end of the nut, wherein the spindle is adapted to fracture at a preselected location adjacent the outermost end of the nut if an obstacle is encountered;

an elongated one-piece bushing having a bearing surface with a length approximately equal to the length of the bore and positioned within the bore between the connecting end and the outermost end to thereby increase the strength of the assembly along the length of the nut;

wherein the nut includes structure cooperating with the one-piece bushing for increasing the breaking resistance of the nut to facilitate the fracturing of the spindle at the preselected location upon the encountering of an obstacle, the structure for increasing the breaking resistance including a root portion in the threads, the root portion substantially devoid of a V-shaped cross section to thereby reduce the incidence of breakage along the root and provide a tight fit when threadingly received in the spindle bar; and wherein the spindle includes a shank bearing portion rotatably supported within by the bearing surface.

22. The invention as set forth in claim 21 wherein the structure for increasing the breaking resistance of the nut further includes a central portion immediately adjacent the threads having a radius at least approximately equal to the radius of a radially outermost portion of the threads.

* * * * *